April 7, 1925. 1,532,126
H. L. EDRIDGE
RELEASE RELIEF VALVE FOR AIR BRAKE SYSTEMS
Filed March 14, 1924
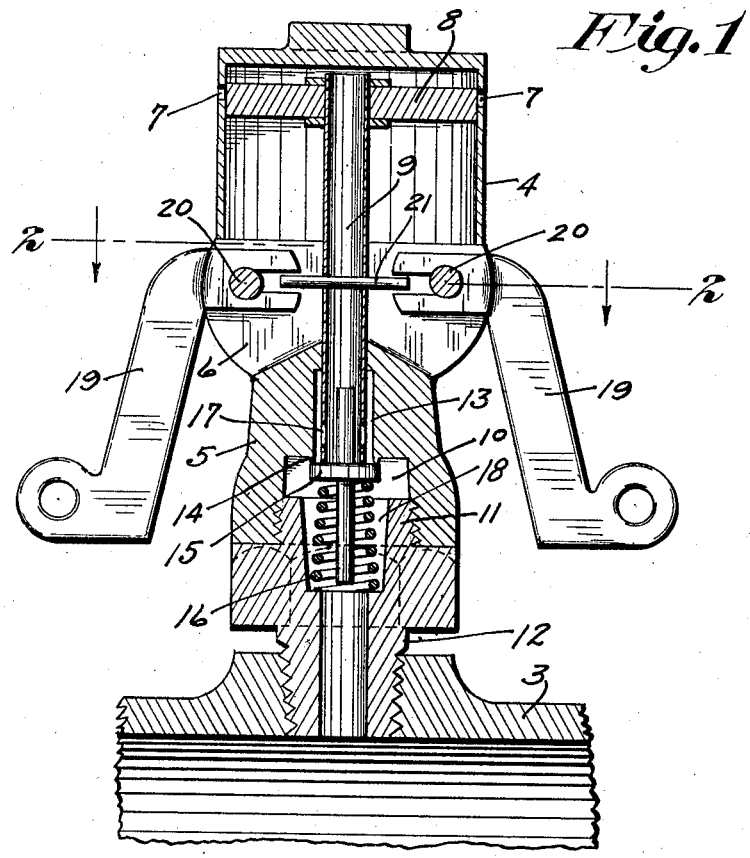
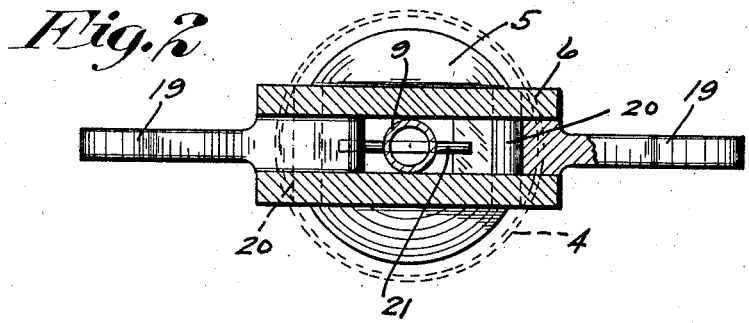
Inventor
H. L. Edridge
By his Attorneys Patented Apr. 7, 1925.

1,532,126

UNITED STATES PATENT OFFICE.

HARTWELL L. EDRIDGE, OF MINNEAPOLIS, MINNESOTA.

RELEASE RELIEF VALVE FOR AIR-BRAKE SYSTEMS.

Application filed March 14, 1924. Serial No. 699,214.

*To all whom it may concern:*

Be it known that I, HARTWELL L. EDRIDGE, a citizen of the United States, residing at Minneapolis, in the county of Hennepin and State of Minnesota, have invented certain new and useful Improvements in Release Relief Valves for Air-Brake Systems; and I do hereby declare the following to be a full, clear, and exact description of the invention, such as will enable others skilled in the art to which it appertains to make and use the same.

My invention provides an extremely simple and highly efficient release relief valve for air brake systems, and, generally stated, the invention consists of the novel construction, combinations and arrangements of parts hereinafter described and defined in the claims.

Air brake systems are universally provided with relief valves usually applied directly to the auxiliary reservoirs and always arranged to be automatically closed so that there will be no danger of the reservoirs being accidentally left open for discharge of the air to the atmosphere.

With the old or standard relief valves, it is necessary, when the reservoirs are to be relieved from pressure, for the operator to hold the valve open during the entire "bleeding" operation and action, requiring several minutes. The "bleeding" of the auxiliary reservoirs of a train of cars equipped with such old or standard valves has, therefore, required considerable time, if performed by one person and, of course, it is never feasible to assign a number of men to perform such simple operations.

My invention provides an automatically closing quick-opening relief valve, which, by a simple and quick operation, may be opened, which will remain open during the bleeding operation, and which will then automatically close.

With a train of cars equipped with these quick-opening relief valves, the operator simply goes from one car to the other, giving each relief valve a quick initial opening movement, and the completion of the bleeding of the reservoirs and other connections of the air brake system will necessarily follow, and when such is accomplished, the air brake system will be automatically set in position to receive the next charge of air when the air brake system is again put into operation.

In the accompanying drawings, which illustrate the invention, like characters indicate like parts throughout the several views.

Referring to the drawings:

Fig. 1 is a vertical section showing a fragment of an auxiliary reservoir of an air brake system and one of my improved quick-opening valves applied thereto; and Fig. 2 is a horizontal section on the line 2—2 of Fig. 1.

The auxiliary reservoir, a portion of which only is shown, may be of the usual or any suitable construction, as indicated by the numeral 3. In the construction illustrated, the cylinder structure of the relief valve is a casting comprising a cylinder 4 cast integral with a base 5 and with laterally spaced parallel plate-like flanges 6, the latter being between the open lower end of the cylinder and the said base. The cylinder 4 is closed at its upper end, but is provided with one or more lateral air-discharge ports 7 located below its closed head. Working within the cylinder 4 is a piston head 8 having a tubular stem 9. The base 5 has an axial recess 10 internally threaded so that it is screwed onto the hub 11 of a plug 12, the reduced lower end of which latter is tubular, is externally threaded and screwed into and extends through the top of the auxiliary reservoir 3. Preferably, the intermediate portion of the plug 12 is given the external form of a nut or bolt head. The lower end of the tubular piston stem 9 works axially through the upper portion of the base 5 and the latter, surrounding the lower end of said stem and spaced therefrom, has an axial air passage 13 that extends down to a valve seat 14. An inwardly opening check valve 15 is normally pressed against the valve seat 14 by a coiled spring 16. As will presently appear, the air passage 13 operates as a primary air discharge port and the air ports 7 operate as secondary air discharge ports. As shown, the valve 15 has a stem that projects both upwardly and downwardly, this, however, being a minor feature. The tubular valve stem 9, in its lower portion, is provided with one or more air passages 17. The check-valve-closing spring 16, as shown, is compressed directly between the valve 15 and a seat formed at the bottom of a recess 18 formed in the upper portion of the plug 12 and having a diameter greater than that of the air passage through the lower portion of said plug.

Suitable means is provided for manually moving the piston 8 and check valve 15 to effect the initial discharge of air from the reservoir. For this purpose, I have shown two valve-releasing levers 19, the inner ends of which fit closely between the plate-like flanges 6 and are pivotally connected thereto near their inner ends by pivot pins 20. The short inner ends of said levers 19 are notched or bifurcated so that they embrace the ends of a pin 21 projected diametrically through the tubular piston stem 9. The free outer ends of the levers 19 are shown as provided with eyes to which releasing connections, such as chains, cables, or the like, may be attached and extended therefrom to opposite sides of the car, so that the opening of the relief valve may be easily accomplished by a person on either side of the car and without getting under the car.

Normally, the valve 15, the piston 8 and other movable parts will be in the positions best shown in Fig. 1 and, of course, the relief valve will then be closed. The spring 16 normally holds the check valve 15 against the seat 14 and the piston 8 will be positioned with its upper surface slightly above the secondary relief ports 7. Slow leakage of air between the piston 8 and cylinder 4 will permit said piston to move above said secondary relief ports, or if there should be no such leakage, a very slight compression of air would permit said piston to assume substantially the position shown in Fig. 1. The check valve 15, of course, engages the seat 14, forming a leak-proof joint.

To set the relief valve into action, it is only necessary, by movement of one or other of the levers 19, to move the piston 8 slightly downward so as to open the secondary ports 7 and, simultaneously therewith, cause the piston stem 9 to press the check valve 15 from its seat 14, thereby opening the primary relief port 13. This permits the air to escape from the auxiliary reservoir into the primary relief port 13 and from thence through the air passages 17 and tubular valve stem 9 into the upper or outer end of the cylinder 4, where the caged air, acting on the relatively large area of the piston 8 will, with very considerable force, hold the piston 8 in position to open the port 7 and the check valve 15 away from its seat 14 and in position to keep the primary relief port 13 open; and this discharge action will continue as long as the pressure in the auxiliary reservoir is materially above atmospheric pressure. Otherwise stated, the area of the piston 8 in respect to the diameter of the primary relief port 13 and valve seat 14 is so large that very slight pressure above atmospheric pressure will serve to keep said piston and check valve in open positions, thereby insuring "bleeding" of the auxiliary reservoir and air brake connections substantially down to atmospheric pressure, and thereupon, the relatively small force exerted by the spring 16 will become sufficient and active to automatically close the check valve 15 and move the piston 8 back to its normal position shown in Fig. 1. It will, of course, be noted that the piston 8 also acts as a valve to open and close the secondary air relief ports.

The efficiency and desirability of this improved check valve is thought to have been made obvious from the foregoing description and statements made.

If, at any time, it should be necessary to "bleed" the air brake system only partially, or, otherwise stated, to stop the discharge of air through the relief valve before the auxiliary reservoir has been reduced anywhere nearly down to atmospheric pressure, this may be done simply by forcing inward one of the levers 19, thereby forcing the check valve 15 against its seat 14. When said check valve is once forced against its seat and there held for a short interval to prevent slight leakage between the piston 8 and cylinder 4, then said check valve will remain closed under the action of the spring 16 and will stop further bleeding of the air brake system. This action is especially important at times when the reservoirs are bled while connected in a train and when one of the triple valves may stick, causing the brakes to release and air to be admitted to the auxiliary reservoir that is being bled.

What I claim is:

1. A relief valve comprising a valve casing having a valve seat and a primary relief port connected therewith, a cylinder having a lateral secondary relief port, a piston working in said cylinder, normally closing said secondary relief port, an air passage opening into said primary relief port and leading to the outer end of the cylinder, the initial opening movement of said check valve serving to admit air to the outer end of said cylinder and the air thus admitted serving to move said piston into a position to open said secondary relief port and hold said check valve in a position to keep said primary relief port open until the pressure of air in said valve casing has been reduced toward atmospheric pressure.

2. A relief valve comprising a valve casing having a valve seat and a primary relief port connected therewith, a cylinder having a lateral secondary relief port, a piston working in said cylinder, normally closing said secondary relief port, and having a tubular valve stem with an air passage opening into said primary relief port, the initial opening movement of said check valve serving to admit air to the outer end of said cylinder and the air thus admitted serving to move said piston into a position to open said secondary relief port and hold said check valve in a position to keep said primary relief port open until the pressure of air in said valve casing has been reduced toward atmospheric pressure.

3. The structure defined in claim 2 in further combination with a spring yieldingly holding said check valve normally in a port-closing position.

4. The structure defined in claim 2 in further combination with manually operated means for moving said piston to open said secondary relief port and cause said check valve to open said primary relief port.

5. The structure defined in claim 2 in further combination with a spring yieldingly holding said check valve normally in a port-closing position, and in further combination with a spring normally holding said check valve in a position to close said primary relief port and said piston in a position to close said secondary relief port.

In testimony whereof I affix my signature.

HARTWELL L. EDRIDGE.